United States Patent [19]
Holly et al.

[11] Patent Number: 6,116,648
[45] Date of Patent: Sep. 12, 2000

[54] MOTOR VEHICLE

[75] Inventors: Martin Holly, Coventry; Andrew Scott, Banbury, both of United Kingdom

[73] Assignee: Rover Group Limited, Warwick, United Kingdom

[21] Appl. No.: 09/373,479

[22] Filed: Aug. 12, 1999

[30] Foreign Application Priority Data

Aug. 13, 1998 [GB] United Kingdom ................... 9817536

[51] Int. Cl.⁷ ..................................................... B62D 1/19
[52] U.S. Cl. ............................................................ 280/777
[58] Field of Search ............................................ 280/777

[56] References Cited

U.S. PATENT DOCUMENTS

| | | | |
|---|---|---|---|
| 5,005,863 | 4/1991 | Drefahl | 280/777 |
| 5,242,195 | 9/1993 | Wendling | 280/777 |
| 5,482,320 | 1/1996 | Passebecq | 280/777 |
| 5,618,058 | 4/1997 | Byon | 280/777 |
| 5,870,930 | 2/1999 | Willett et al. | 280/777 |
| 5,893,580 | 4/1999 | Hoagland et al. | 280/777 |

FOREIGN PATENT DOCUMENTS

| | | |
|---|---|---|
| 1 941 991 | 2/1970 | Germany. |
| 197 00 423 | 1/1997 | Germany. |
| 1 160 868 | 8/1969 | United Kingdom. |
| 1 246 352 | 9/1971 | United Kingdom. |
| 1 276 388 | 6/1972 | United Kingdom. |
| 2 300 606 | 11/1996 | United Kingdom. |

*Primary Examiner*—Kenneth R. Rice
*Attorney, Agent, or Firm*—Davis and Bujold

[57] ABSTRACT

A motor vehicle is disclosed having an energy absorbing steering assembly 10 that includes an adjustable energy absorbing mechanism in the form of a hydraulic damper 11. A valve 6 controlling the flow of fluid from the damper is controlled so as to optimize the rate of the damper 11 dependant upon one or more parameters of the motor vehicle.

7 Claims, 1 Drawing Sheet

MOTOR VEHICLE

FIELD OF THE INVENTION

This invention relates to motor vehicles and in particular to energy absorbing steering column assemblies for motor vehicles.

BACKGROUND OF THE INVENTION

It is well known to provide an energy absorbing steering column assembly for a motor vehicle having a collapsible section to reduce the loads transferred to a driver of the motor vehicle in the event of an accident. It is known, for example from DE1941991 to provide such a system in which a hydraulic damper is provided between upper and lower steering columns to control collapse of the column. However it is a problem with such a prior art steering column assembly that, because the rate of damping resisting collapse of the steering column is constant irrespective of the crash conditions, the full length of travel of the collapsing mechanism is not used in less severe crashes, so the loads on the driver are greater than they need be, and in very severe crashes the driver is not slowed sufficiently before the column reaches its fully collapsed state.

It is an object of this invention to provided an improved energy absorbing steering assembly for a motor vehicle.

SUMMARY OF THE INVENTION

According to the invention there is provided a vehicle steering column assembly for transmitting steering torque from a steering wheel to a steering actuation means, the assembly comprising a lower steering column for connection in use to the actuation means, an upper steering column for connection in use to the steering wheel, said upper and lower steering columns being movable longitudinally relative to each other to allow collapse of the assembly, and an energy absorbing mechanism connected between the upper and lower steering columns wherein the energy absorbing mechanism is adjustable to vary the resistance that it provides to such collapse.

The present invention further provides a motor vehicle comprising an assembly according to the invention, measuring means for measuring at least one parameter, and control means arranged to adjust the energy absorbing mechanism in response to the value of the measured parameter

DETAILED DESCRIPTION OF THE PREFERRED EMBODIMENTS OF THE INVENTION

Figure 1:
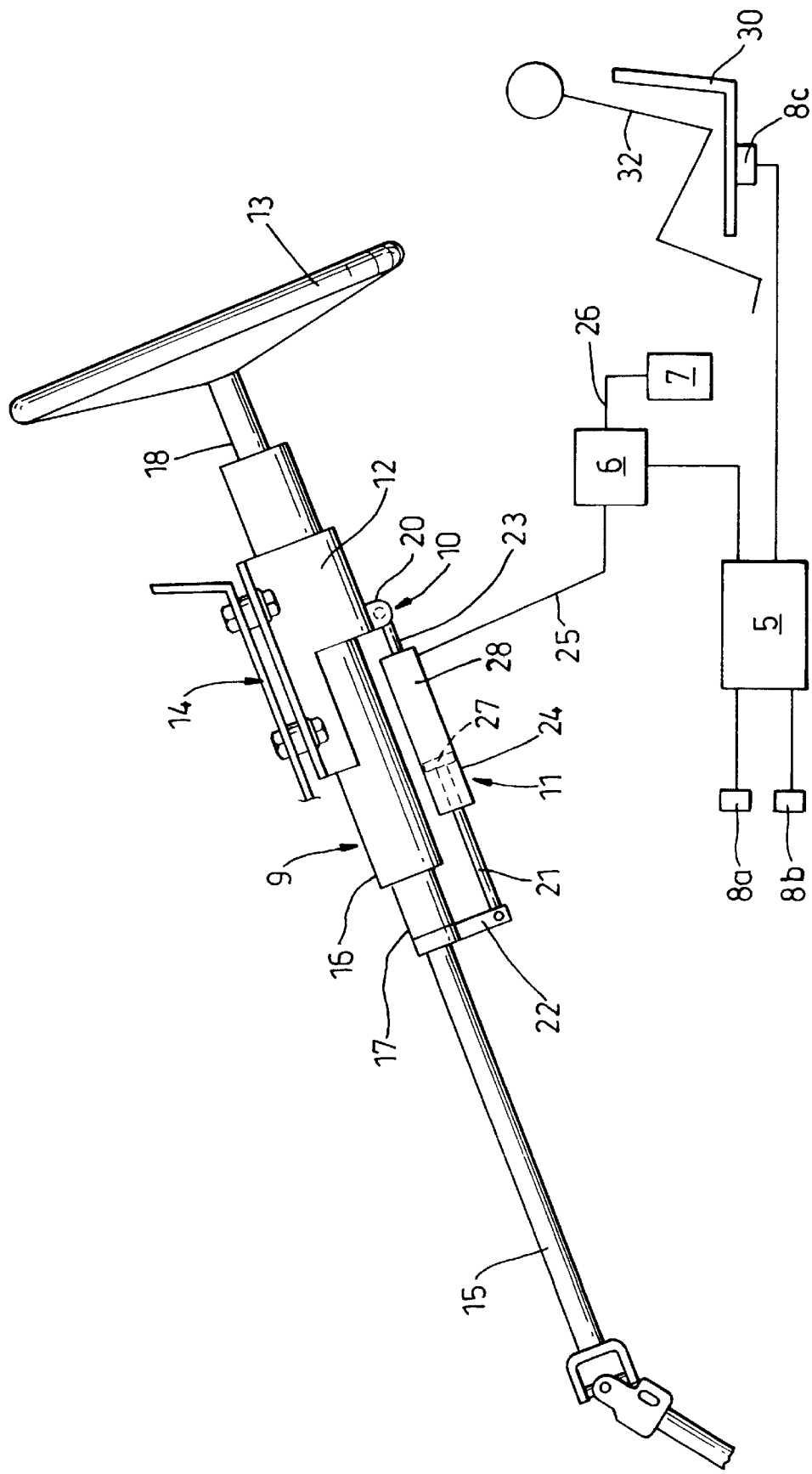
FIG. 1 is a schematic view of a steering column assembly according to the invention.

With reference to FIG. 1 an energy absorbing steering column assembly 10 is attached by means of a bracket 12 to part of a body structure 14 forming part of a motor vehicle.

The steering column assembly 10 comprises an upper steering column 18 to which is attached a steering wheel 13, a lower steering column 15 for connection to a steering actuation means such as, for example. a steering rack or a steering box, and a column collapse mechanism 9 operating between said upper and lower steering columns 18, 15 and allowing them to move relative to each other in a direction longitudinally of the columns 15, 18 so as to allow collapse of the assembly 10.

The column collapse mechanism 9 has an outer tubular member 16 fixed to the upper column 18 and an inner tubular member 17 fixed to the lower column 15 and axially slidable within the outer tubular member 16. An energy absorbing device in the form of a hydraulic damper 11 is connected between the upper and lower steering columns 15, 18 so as to operate in parallel to the column collapse mechanism 9 to control the collapse of the assembly 10. The hydraulic damper 11 has a cylindrical housing 24 in which is slidably mounted a piston 27 to define in combination with the housing 24 a variable volume working chamber 28. The piston 27 is connected by means of a piston rod 21 to a bracket 22 extending from a lower end of the inner tubular member 17. The damper housing 24 is connected by a linkage 23 to a lug 20 extending from the outer tubular member 16. The chamber 28 is connected by means of a conduit 25 to an adjustable control valve 6.

The control valve 6 is connected by means of a second conduit 26 to a dump tank 7. The adjustable control valve 6 is controlled by an electronic control unit 5 so as to control the resistance to the flow of fluid from the chamber 28 to the dump tank 7, and hence the damping rate, or resistance to collapse, of the damper 11. This controls the force on the driver from the steering wheel for a given rate of collapse. and therefore also the total amount of energy that the assembly can absorb over the total collapsing distance, which is a fixed function of the assembly. The electronic control unit 5 receives signals from a vehicle speed sensor 8a, a vehicle acceleration sensor 8b, and a driver's weight sensor 8c. The vehicle speed sensor 8a measures the speed of the motor vehicle and provides a signal indicative of the speed of the motor vehicle to the electronic control unit 5. The acceleration sensor 8b measures the acceleration of the motor vehicle and sends a signal indicative of the acceleration or deceleration of the motor vehicle to the electronic control unit 5. The sensor 8c is a load sensor located in the base of a seat 30 normally occupied by a driver 32 of the motor vehicle. The sensor 8c measures the weight of the driver of the motor vehicle and sends a signal indicative of this weight to the electronic control unit 5.

When the motor vehicle is involved in a crash the acceleration sensor 8b sends a signal to the electronic control unit 5 indicating that rapid deceleration of the motor vehicle is occurring. The electronic control unit 5 receives signals from the speed sensor 8a and the load sensor 8c and is operable to send a signal to the adjustable control valve 6 to vary the restriction to flow through the conduit 25 in accordance with these parameters.

If a crash is severe enough the driver of the motor vehicle will impact against the steering wheel 13 thereby causing the upper column 18 to be moved towards the lower column 15. This urges the inner tubular member 17 into the outer tubular member 16 against the resistance of the damper 11. As the inner tubular member 17 is moved further into the outer tubular member 16 the piston 27 is moved by means of the piston rod 21 in a direction reducing the volume of the chamber 28 defined between the piston 27 and the cylinder 24. This causes fluid to flow from the chamber 28 through the conduits 25, 26 via the adjustable control valve 26 to the dump tank 7. The essentially incompressible nature of the hydraulic fluid in the chamber of the damper 11 is such that the load applied by the energy absorbing member is determined by the level of resistance to the flow of the hydraulic fluid from the chamber 28.

The most favourable resistance to collapse of the column depends on the amount of energy that needs to be absorbed to slow the driver as he is thrown forwards onto it. This in turn depends on two main factors: the initial speed of the vehicle on impact, and the weight of the driver. Forces in the range of about 5 kN to 9 kN are typical for crash speeds between 20 and 50 mph. The control unit 5 will include a look-up table of desired degrees of opening or closing of the control valve 6 for all possible combinations of vehicle speed and driver weight. Generally the damping rate, or resistance to collapse, will be higher for higher vehicle speeds and higher for higher driver weights.

When the acceleration sensor 8b indicates that a crash is in progress the electronic control unit determines the preferred collapse force for the damper 11 based upon the initial speed of the motor vehicle and the weight of the driver. In this embodiment this force is then maintained for the entire crash with no variation.

It will be appreciated that the total resistance to steering column collapse does not need to be provided by the damper 11. The connection between the upper and lower steering columns 18, 15 and the inner and outer tubular members 16, 12 can be arranged to provide some resistance, and therefore energy absorption. This can be set at the minimum level that might be required, with the damper 11 only being used to increase the resistance above this minimum level.

In a second embodiment of the invention the whole system is the same as described above, but the driver's weight sensor is omitted. This allows the resistance to column collapse to be controlled purely on the basis of the impact speed of the vehicle. Clearly this has benefits over current passive systems whilst not allowing the level of control provided by the first embodiment.

It will be appreciated by the man skilled in the art that various modifications can be made to the embodiments described without departing from the general inventive concept of the invention. For example the adjustable control valve could be formed as part of the damper, for example being formed in the damper housing. This would reduce the effects of the nature of the conduit 25 on the rate of the damper 11.

In a further embodiment of the invention the hydraulic damper is replaced with a friction damping device. An example of such a device used for suspension damping is described in DE 197 00 423. The damper can be controlled by an electrical or hydraulic actuator so as to vary the contact force between two friction elements and thereby to control the resistance to their relative movement.

It is also possible to use the deceleration of the vehicle as measured by the acceleration sensor 8b to determine the desired rate of the damper. This is because, for a given initial vehicle speed, the rate at which the driver will need to be slowed will depend on the rate of deceleration of the whole vehicle. For a sudden impact with a solid rigid object the vehicle deceleration will be very high and all the energy of the driver's forward movement will need to be absorbed in a very short period of time. If on the other hand the vehicle collides with another vehicle it will decelerate at a lower rate and down to a speed which may be greater than zero. It is therefore likely that less energy will need to be absorbed and a lower damper rate will be required.

We claim:

1. A vehicle steering column assembly for transmitting steering torque from a steering wheel to a steering actuation means, the assembly comprising a lower steering column for connection in use to the actuation means, an upper steering column for connection in use to the steering wheel, said upper and lower steering columns being movable longitudinally relative to each other to allow collapse of the assembly, and an energy absorbing mechanism connected between the upper and lower steering columns so as to provide a resistance to such collapse, wherein the energy absorbing mechanism is adjustable to vary said resistance.

2. An assembly according to claim 1 in which the energy absorbing mechanism comprises a hydraulic damper.

3. An assembly according to claim 2 wherein the damper includes a working chamber and valve means for controlling the rate at which fluid can leave the chamber.

4. A vehicle comprising: a steering wheel; a steering actuating means; a steering column assembly for transmitting steering torque from the steering wheel to the steering actuation means, the assembly comprising a lower steering column for connection in use to the actuation means, an upper steering column for connection in use to the steering wheel, said upper and lower steering columns being movable longitudinally relative to each other to allow collapse of the assembly, and an energy absorbing mechanism connected between the upper and lower steering columns so as to provide a resistance to such collapse, wherein the energy absorbing mechanism is adjustable to vary said resistance; measuring means for measuring at least one parameter; and control means arranged to adjust the energy absorbing mechanism in response to the value of the measured parameter.

5. A vehicle according to claim 4 wherein the measuring means is arranged to measure a speed of the vehicle and the control means is operable to adjust the energy absorbing mechanism in relation to the measured speed of the vehicle.

6. A vehicle according to claim 4 wherein the measuring means is arranged to measure the deceleration of the vehicle and the control means is operable to adjust the energy absorbing mechanism in relation to the measured deceleration of the vehicle.

7. A vehicle according to claim 4 wherein the measuring means is arranged to measure the weight of a driver of the vehicle and the control means is operable to adjust the energy absorbing mechanism in relation to the measured weight of the driver.

* * * * *